Oct. 24, 1933.  R. L. CARR  1,931,572
VEHICLE BODY
Filed May 3, 1929  2 Sheets-Sheet 1
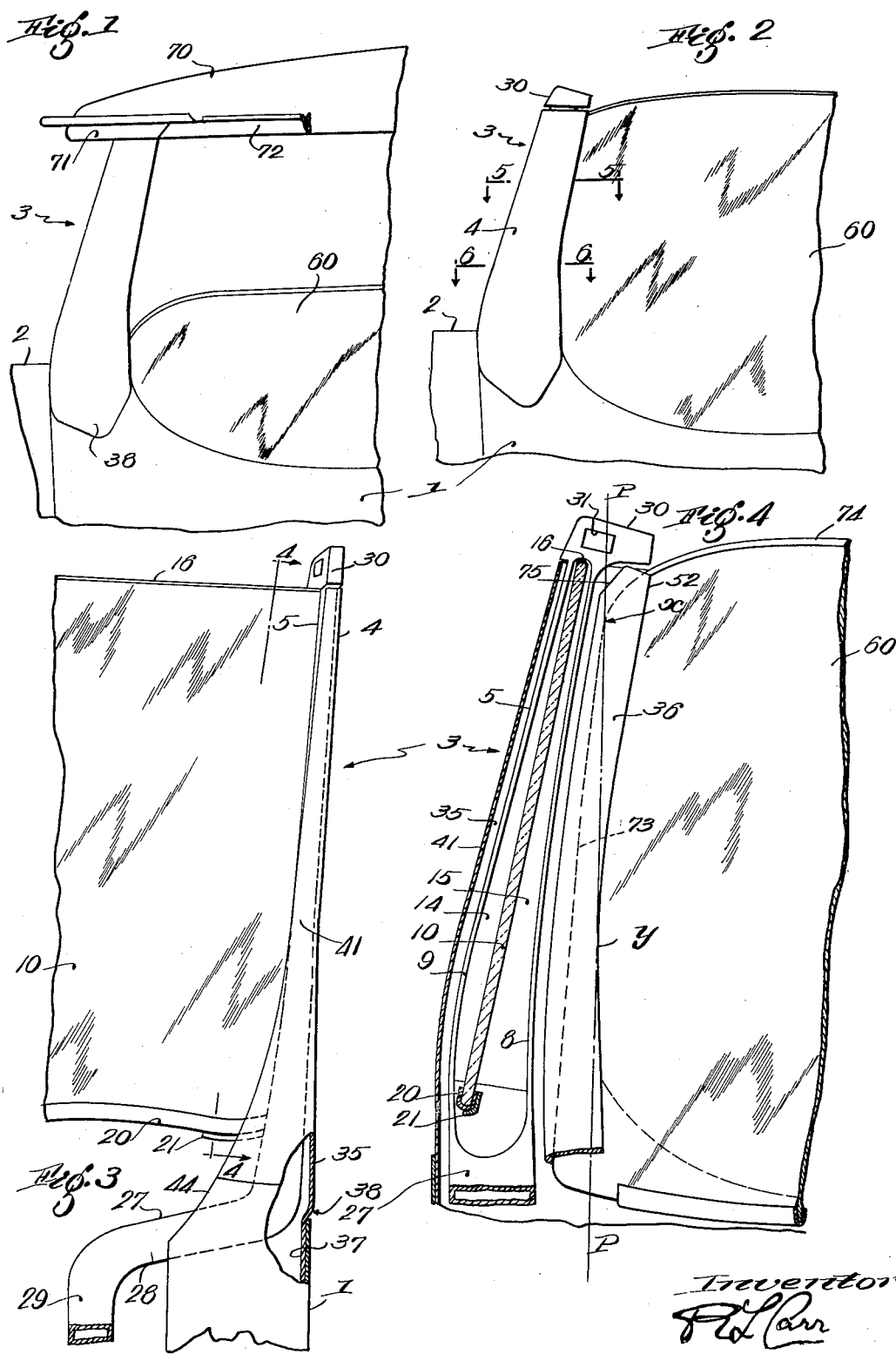

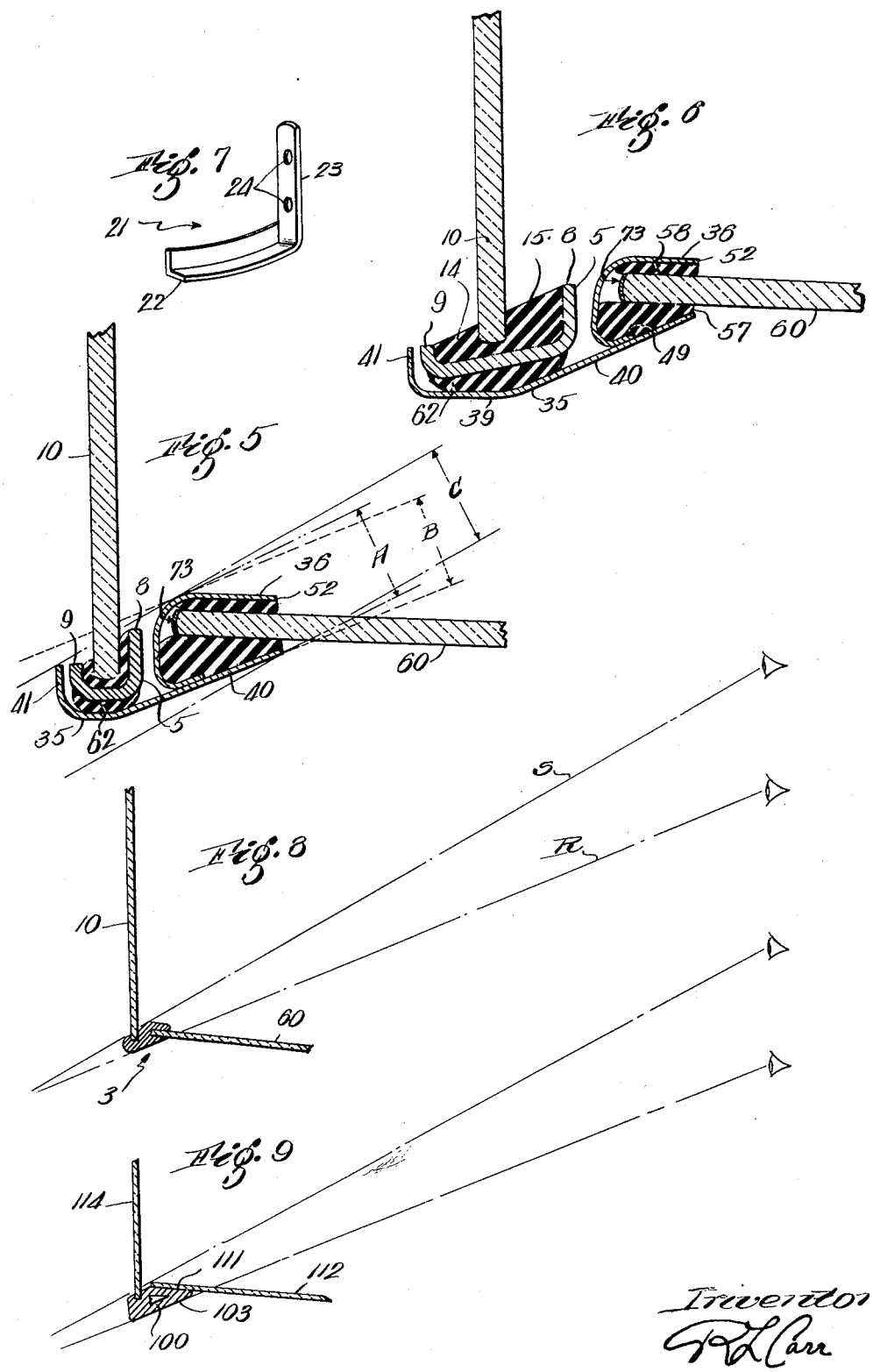

Patented Oct. 24, 1933

1,931,572

UNITED STATES PATENT OFFICE 1,931,572

VEHICLE BODY

Raymond L. Carr, Boston, Mass.

Application May 3, 1929. Serial No. 360,105

18 Claims. (Cl. 296—28)

This invention relates to improvements in vehicle bodies and more particularly to improvements in windshield standard assemblies, certain aspects thereof being particularly suitable for employment in closed or convertible bodies and other aspects thereof being generically applicable to all types of bodies. In some respects the subject matter of the present case is similar to that of my copending application Serial No. 91,209, filed February 27, 1926, now Patent #1,826,922, dated Oct. 13, 1931.

While it is comparatively easy to provide a windshield standard for an open car which does not objectionably obstruct the vision of the driver, in the case of closed or convertible vehicles where the front edge of the side window or closure panel is engaged by the windshield standard assembly, it is difficult to prevent the latter from interfering unduly with the driver's view. A slanting windshield generally is considered more desirable than one that is substantially vertical, not only due to the improved appearance of the vehicle permitted thereby but also due to the elimination of undesirable light reflections from the windshield panel, lessened wind resistance, greater width of the field of vision between the windshield standards, and the reduced length and greater compactness of the top. Particularly from the point of view of undesirable light reflection and appearance it is desirable to have the windshield panel inclined at an angle of at least ten degrees to the vertical. However, in the case of closed or convertible vehicles the provision of a windshield inclined at such an angle generally has necessitated the inclined front edge of the side window being exposed when the latter was in a partially raised position, thus failing to give suitable support to the panel edge, introducing an element which marred the appearance of the vehicle and which might further tend to obstruct or confuse the vision of the driver. Furthermore, an unsupported glass edge of this character is likely to result in a perceptible whistle or high-pitched resonance at high speeds. There have been certain attempts to remedy this defect in the case of closed or convertible vehicles such, for example, as the arrangement disclosed in the patent to Simpson No. 1,602,714 which, however, necessitates a partially exposed panel front edge when the latter is in an intermediate position and also results in an objectionably bulky front door post or windshield standard assembly.

The present invention is designed primarily to remedy these defects in windshield standard assembly construction and to permit the provision of an opaque post assembly at the front corner of the body which affords a minimum obstruction to the view of the driver, particularly in the region of the eye level, which however permits the complete or substantial concealment of the front edge of the closure panel or side window throughout its path, and which permits the provision or a windshield panel having a substantial inclination to the vertical, for example between ten and fifteen degrees.

The invention also provides an assembly which may be neat and attractive in appearance and which may ensure a particularly effective weather-tight seal between the door post and windshield standard. Furthermore although the cross-sectional dimensions of the assembly are reduced to the minimum at the eye level of the vehicle occupants, the material of the windshield standard is so disposed as to provide the same with ample structural strength. To this end the present invention provides an assembly wherein the portions engaging and supporting the edge of the windshield panel and the edge of the side window are substantially in alignment with each other in the driver's line of vision. In other words, one of these panel engaging portions is disposed behind the other as viewed by the driver. Furthermore, the sides of the assembly at the level of the driver's eyes are preferably so disposed in relation to the portion of the assembly which provides the greatest obstruction to the driver's vision that a considerable change in the driver's position will not substantially alter the obstruction to vision afforded by the windshield standard assembly. While both the inner and outer faces of the assembly are therefore substantially aligned with the driver's line of vision, they are disposed at an angle to each other, thus converging from the region of maximum vision obstruction so that the driver may vary his position considerably in relation to the standard without having the effective width thereof materially changed.

In order to permit the closure panel to have its front edge substantially concealed throughout its path, the lower rear edge of the assembly preferably is directed at a substantial angle to the plane of the windshield panel, while the upper portion of this edge may substantially parallel the panel. Thus the lower portion of the assembly has a greater depth longitudinally of the vehicle than the upper portion thereof, affording adequate room to permit the lower part of the windshield standard to have suitable structural strength. In other words, the strains which are received by the windshield standard, for example from the top or from exterior sources, are ultimately opposed by the lower portion of the standard which is connected to the body. Accordingly the standard may advantageously resemble an ideal cantilever beam in the distribution of its material, having the major portion of the latter disposed adjoining the body where the stresses ordinarily are higher.

In accordance with the present invention, the door post preferably may have a portion disposed beside substantially the entire outer side of the windshield standard and preferably extending around the front thereof substantially to conceal the same, thus affording a smooth unbroken appearance to the assembly and permitting an unusually effective weather-tight seal. For this purpose the front of the door preferably is aligned with the front of the standard assembly, and the lower portion of the windshield standard which is concealed within the cowl extends inwardly to avoid interference with the door. In order to permit the satisfactory connection of the standard with the top, I preferably provide the former with an enlarged cap portion, the outer surface of which may be substantially aligned with the portion of the door post that encloses the windshield standard. When the top is raised this cap portion is substantially concealed. Due to this arrangement the upper edge of the side window preferably has a curvature downwardly toward its front edge, although this arrangement is not necessary to the means for concealing its front edge. Due to this curvature, however, the panel, when fully raised, has merely a slightly curved upper edge portion exposed, while when it is partially raised substantially all of this curved portion may be unconcealed.

In accordance with this invention, the windshield panel preferably has its lower edge supported upon brackets, while being held between cushioning elements in the standard which do not necessitate the accurate positioning of the panel and which permit its limited movement in response to shock.

The above and further objects and advantageous features of the invention will be apparent to those skilled in the art upon a reading of the subjoined description and claims taken in conjunction with the accompanying drawings, in which:

Fig. 1 is a side elevational view of the front portion of a vehicle body in which my improved windshield standard assembly is incorporated, the side window being shown in a partially lowered position;

Fig. 2 is a similar view of a portion of the vehicle body with the top lowered and the window fully raised;

Fig. 3 is a front elevational view of the windshield assembly, parts being broken away to afford clarity in illustration;

Fig. 4 is a section on line 4—4 of Fig. 3;

Figs. 5 and 6 are sections on line 5—5 and line 6—6 respectively of Fig. 2;

Fig. 7 is a perspective view of one of the brackets for supporting the windshield panel; and Figs. 8 and 9 are diagrammatic views of windshield assemblies and the panels engaging the same, showing the relationship of the eyes of the driver in different positions to the assemblies.

Referring to the accompanying drawings which are illustrative of one embodiment of my invention, the numeral 1 designates the upper front portion of the door of a vehicle and the numeral 2 designates the cowl. The windshield standard assembly is designated generally by the numeral 3 and comprises a door post 4 that is secured to the door 1, and the windshield standard 5.

For convenience of description I will first explain in detail the preferred construction of the standard 5. The body of the latter preferably is of channel-like cross section, as shown more particularly in Figs. 5 and 6. In order to permit the minimum obstruction to vision, however, the rear channel leg 8 has its edge disposed inwardly of the similar edge of the front channel leg 9 throughout a substantial portion of the height of the standard. The lower portion of the standard, as shown more particularly in Fig. 4, has a substantial depth longitudinally of the vehicle, thereby affording the standard a desirable factor of safety, while the upper portion of the standard in the region of the driver's eyes has its legs 8 and 9 arranged in close juxtaposition to the edge of the windshield panel 10 which is received therebetween. Thus, for example, the thickness of the panel 10 may form a rather large fraction of the distance between the channel legs; for example, at least one-quarter of this distance and preferably more than a half of the same at the top of the panel.

Preferably the panel 10 is inclined at a substantial angle to the vertical, for example, at an angle of over ten degrees. The upper portion of the windshield standard has its front and rear flanges substantially paralleling the windshield panel, i. e. having a similar inclination to the vertical, while the lower portion of the rear leg 8 diverges away from the plane of the panel so that it may be disposed substantially in a vertical plane as it meets the body, as shown in Fig. 4. The major portion of the front edge of the standard may have a slightly greater inclination than the panel and then have a substantially vertical portion as it extends down to the body.

Suitable cushioning means such as rubber blocks 14 and 15 are disposed between the standard flanges 8 and 9 and the panel respectively to cushion the latter and hold it in place. The upper edge of the panel may conveniently be bound by a metal strip 16 having a slight transverse and longitudinal curvature, thus protecting and reinforcing the same without materially obstructing vision when the top is lowered. The lower edge of the panel preferably is disposed in a channel 20, the ends of which rest upon brackets 21. One of the latter is disclosed more particularly in Fig. 7, being provided with an angular body portion 22 which is adapted to engage the bottom and rear leg of the channel 20 and with an upwardly extending portion 23 having suitable openings 24 for connection to the outer wall of the windshield standard. It is thus evident that the panel is only rigidly supported at its lower end and that the remainder thereof is yieldably mounted due to the cushioning blocks 14 and 15 at either side thereof.

Within the body the channel-like section of the standard merges into a tubular or box-like section 27 which preferably has an inwardly extending portion 28 to permit the portion of the standard 29 that is connected to the body to be located inwardly of the door 1.

A cap 30 preferably is formed at the top of the standard above the panel 10, having a substantially greater depth longitudinally of the vehicle than this portion of the windshield standard and providing sufficient area for ready engagement with means for securing the front section of the top in place when the same is raised. For this purpose, for example, an opening 31 may be disposed in the cap 30.

The door post 4 preferably is formed of inner and outer sheet metal portions 36 and 35. The latter may be secured to the upper portion of the door frame by bolting, riveting, welding or the like, or it may be a continuation of the outer finishing sheet of the door with suitable internal reinforcements if necessary, but preferably it is a continuation of the channeled frame 37 of the door which may be pressed out, as designated by numeral 38, to provide the appearance of a separate windshield standard.

Adjoining the door the outer member 35 may have a portion disposed substantially in parallelism to the adjoining outer wall of the door, as designated by numeral 39, Fig. 6, and a rear portion inclining inwardly from the same, as designated by numeral 40, this portion preferably being disposed substantially in the plane of the driver's line of sight. The front portion of the metal member 35 preferably is curved inwardly at the front of the standard to provide a flange 41 which extends downwardly to the bight portion of the door frame channel 37, gradually increasing in width as it approaches the latter, as designated by numeral 44. The upper portion of the outer metal section 35 is shaped as shown in Fig. 5 so that its inclined section 40 merges directly into its front flange 41 without any substantial portion therebetween which is parallel to the door wall.

The inner post member 36 preferably is substantially J-shaped, having a flange portion 49 secured by welding or the like to the inclined portion 40 of the outer member 35 and having a longer flange 52 spaced inwardly from the member 40 and substantially paralleling the plane of the door 1. Thus the member 36 cooperates with the rear portion of the member 35 in providing a suitable channel having cushioning elements 57 and 58 therein for the reception of the front edge of the closure panel 60. The latter preferably is provided with any suitable lifting mechanism and may be positioned in a concealed position within the vehicle door or may be raised to a position wherein it engages the top or may occupy any desired intermediate position. The front portion of member 36 preferably is disposed in substantial parallelism to the rear flange 8 of the windshield standard, a suitable clearance space being provided between these members, however, while the flange 41 of the door post preferably is shaped substantially to parallel the front flange 9 of the standard with a similar clearance space therebetween. The outer wall of the standard preferably carries a cushioning element 62 cemented or otherwise secured thereto to form a compressible abutment for the door post element 35, thus assuring the firm engagement of the upper end of the door post and the standard.

Preferably the upper edge of the post parallels the lower edge of the cap member 30, as shown particularly in Fig. 2, and when the top 70 is raised, it preferably has a depending lip 71 of rubber or the like which substantially conceals the cap and renders the gap between the same and the post inconspicuous; this lip may be arranged to flex slightly to permit the upper corner of the raised panel to pass the same, when the door is opened or closed.

As shown, the top may be provided with any suitable valance 72 such, for example, as shown in my copending application Serial No. 311,119, filed October 8, 1928, to engage the panel when it is fully raised. The front edge 73 of the panel preferably may substantially parallel the front portion of the member 36 (Fig. 4), being spaced therefrom with a reasonable clearance space therebetween, as shown more particularly in Figs. 5 and 6. The upper edge of the panel has a front portion which has a gradually increasing curvature downward to join the front edge at a point marked $x$, Fig. 4; thus, even when fully raised, clearing the cap 30. If desired, the front and upper edge of the panel may be reinforced by a curved molding 74 similar to that at the top of the windshield panel. The upper portion of the member 36 may substantially follow the curvature of the upper edge of the panel and be secured to member 35, as designated by numeral 75, in order to provide additional stiffness for this portion of the door post, while its lower end may be secured to the door in any suitable way.

The rear edge of the member 35, as shown particularly in Fig. 4, has an upper portion which is inclined substantially to parallel the windshield panel 10 and a lower portion which may be disposed at a substantial angle to the plane of the panel, for example, being substantially vertical, these portions preferably merging into each other in a gradual curvature in order to afford an attractive and graceful appearance. Thus, as viewed from the side of the vehicle the windshield standard assembly has a considerably greater depth at its lower portion than at its upper portion.

Fig. 5 is a section showing the arrangement of the assembly substantially at the level of the average driver's eyes. As shown in this figure the margin of panel 60 which is received between members 57 and 58 is substantially aligned with the windshield standard 5 in the line of the driver's sight so that one of these portions of the assembly, as viewed by the driver, is substantially behind the other, thereby affording the minimum of obstruction to vision. The outer wall 40 of the assembly preferably is disposed at such an angle to the panels 10 and 60 that it is substantially aligned with the driver's line of vision, while the inner effective face or side of the assembly which is defined by the front inner corner of member 36, the edge of flange 41 and, if desired, by the edges of one or both of the standard flanges, also is disposed at such an angle as to be substantially in alignment with the driver's line of sight.

A certain cross-sectional portion of a windshield standard assembly usually determines the minimum possible obstruction to the driver's vision, this portion ordinarily being the standard itself or the window edge receiving portion, and more often the latter. Thus, in the illustrated arrangement, in order to give a suitable overlap between the panel edge and the door post, the panel must have a considerable marginal area engaged within the post, as shown in Fig. 5. Thus the minimum obstruction to vision is determined by the distance between the rear of the outer member 40 and the front inner corner of the inner member 36 of the post, this distance being indicated A in Fig. 5. In order to prevent portions of the assembly at the rear or in front of this portion of the post from increasing the necessary obstruction to vision thus afforded, particularly in view of the various positions laterally of the vehicle which may be occupied by the driver, the sides of the assembly preferably converge as they extend away from this portion thereof. Accordingly the driver may move considerably in either direction without having the obstruction to his vision greatly increased. Fig. 8, for example, shows this possibility, the dot and dash line S indicating the driver's line of vision in one position and the dot and dash line marked R indicating his line of sight in another position, it being noted that the lines S and R are at an appreciable angle to each other and that if both sides of the standard assembly were to parallel either of these lines, it would afford a materially increasing obstruction to vision were the driver to move to the other position corresponding to the other line of sight. The distances B and C (Fig. 5) indicate the effective width of the standard assembly as viewed along lines R and S respectively.

Toward the lower portion of the standard the parts may be in the position shown in Fig. 6, the standard itself having a considerably more substantial cross section, the member 35 being correspondingly deeper and having the straight wall 39.

Since, as shown more particularly in Fig. 4, the front edge 73 of the panel 60 substantially parallels the rear of the windshield standard and has a substantial marginal portion overlapped by the post throughout its path and since the lower portion of the rear edge of the assembly is directed downwardly, substantially all of the front edge of the panel will be concealed even when it is in an intermediate position. This effect may be aided, if desired, by moving the panel in a path which is inclined slightly toward the rear, for example, for a matter of two or three degrees. Such a path is designated by line PP of Fig. 4 which extends from the upper corner x of the panel to the point y where the front edge comes the nearest to being exposed. Fig. 1 illustrates the panel lowered to this position, showing that the front edge is still concealed. It is evident that the inclination of the panel path at a very small angle to the vertical is not impractical or objectionable, since the panel, whether having its rear edge engaged in a rear door post or whether having this edge exposed, will not have an objectionable appearance if this angle does not become very great. It is further evident that an equivalent arrangement may be provided by moving the panel upwardly and then to the rearward along a substantially horizontal or sharply inclined path, thus in effect bringing it to the same point that it would occupy if it followed a gradually inclined path or even providing the effect of a greater inclination to its path. Such a movement of the panel is shown and described more particularly in my copending application Serial No. 91,209 referred to above, and it is contemplated that this arrangement may be advantageously utilized in combination with a standard assembly of the type shown herein.

Fig. 9 shows the arrangement of a windshield standard 100, such for example as is shown in that application, this standard having an outer surface 103 substantially aligned with the driver's line of sight and having an inner wall 111 which determines the minimum effective obstruction to vision, since the side panel 112 is moved longitudinally and must be overlapped by the wall 111 even when moved to its rearmost position. The windshield panel 114 in this embodiment of the invention has its margin engaged in a portion of the standard which is spaced outwardly of the plane of the side panel 112, preferably the inner front corner of this standard being arranged so that the adjoining portion of the adjoining front edge of panel 112 cooperates therewith in defining the inner side of the windshield standard which may be disposed substantially in the line of the driver's line of vision and which is so disposed as to converge with the plane of the outer wall 103 in a direction away from the region of minimum obstruction, i. e., the wall 111.

It is thus evident that certain aspects of my invention are applicable to a windshield standard assembly whether the same is made up of a separate standard and post or whether the standard is also effective in engaging the side panel, and further that both in the foregoing specification and in the following claims the term "windshield standard assembly" is used generically to indicate, for example, a windshield standard whether the same does or does not engage a side panel directly or to indicate a windshield standard in combination with the door post. It is evident that a windshield standard assembly constructed in accordance with this invention permits the windshield panel to be inclined at a substantial angle to the vertical with the resulting advantages which are well recognized, which, however, does not result in the side panel having its front edge objectionably exposed when it occupies a partially raised position, and which provides a very small obstruction to vision, the parts of the assembly being particularly advantageously disposed for this purpose at the level of the driver's eyes where obstruction to vision is most objectionable and being nearly as advantageously disposed adjoining the lower portion of the standard toward which the driver's vision is more rarely directed, for example, in parking or the like. Obviously although the standard itself has a small cross-sectional area adjoining its upper portion, its lower portion, which is subjected to higher stresses, is amply proportioned to receive the same.

It is furthermore evident that the principles of this invention may be embodied in assemblies of different design and construction; for example, while the illustrated embodiment of the invention is particularly suited to employment in conjunction with a rearwardly swinging door, proper positioning of the hinge axis and/or change in the position and/or depth of flange 41 will permit the door to be hinged at its forward end.

I claim:

1. In a vehicle, a windshield standard, a door positioned adjoining the same and carrying a closure panel, said door having an upwardly extending post with a recessed portion to guide the edge of the panel, said post having an extension disposed outwardly of the windshield standard and extending forwardly of the same whereby the standard is substantially enclosed by the post.

2. In a vehicle, a windshield standard, a door positioned adjoining the same and carrying a closure panel, said door having an upwardly extending post with a recessed portion to guide the edge of the panel, said post having an extension disposed outwardly of the windshield standard and extending forwardly of the same whereby the standard is substantially enclosed by the post, the panel receiving portion of the post being disposed inwardly in a lateral direction from a portion of the standard.

3. In a vehicle, a windshield standard, a door, a door post carried thereby, a panel movable upwardly from the door to a position wherein the panel edge is disposed inwardly from the rear portion of the post and concealed thereby, said post having a front portion concealing the entire outer side of the standard throughout substantially its entire height, the standard having a cap portion overhanging said front portion of the post, the vehicle top engaging said cap portion and substantially concealing the same.

4. In a vehicle, a windshield standard assembly, a windshield panel inclined at a substantial angle and engaging said assembly, a door, a side panel movable to a raised position above the door, wherein its front edge is concealed by the assembly, the upper portion of the assembly having an inclined rear edge, the lower portion of said edge being substantially vertical, whereby the panel may be moved along a path having only a slight inclination and yet having substantially all of its front edge concealed by the assembly in all of its intermediate positions.

5. In a vehicle, a windshield standard, a door positioned adjoining the same and carrying a closure panel, said door having an upwardly extending post with a recessed portion at the rear of the standard to guide the edge of the panel, said post having an extension disposed outwardly of the windshield standard and substantially concealing the outer and front faces of the same whereby the standard is substantially enclosed by the post.

6. In a vehicle, a windshield standard assembly, a windshield panel inclined at a substantial angle and having its edge mounted in the assembly, a door, a side panel movable out of the door into a raised position wherein its front edge is concealed by the assembly, said assembly having an upper portion with front and rear edges inclined at an angle substantially conforming to that of the windshield panel, the lower portion of the assembly having a greater depth longitudinally of the vehicle than the upper portion of the assembly and having its rear edge disposed at an appreciable angle to the plane of the windshield panel.

7. In a vehicle, a windshield standard assembly comprising a standard and a door post, the upper part of the standard having rearwardly inclined front and rear margins, the rear margin of the lower part of the standard being substantially vertical, the post having a window-receiving portion at the rear of the standard, said portion having its read edge inclined substantially to parallel the corresponding rear marginal portions of the standard, the lower portion of said rear edge being substantially vertical, whereby the front edge of the window may be concealed throughout a vertical path in engagement with the window-receiving portion of the post.

8. A windshield standard assembly comprising a standard and a post, the former having a windshield panel-receiving portion, the latter having a closure panel-receiving portion, said portions being located substantially one behind the other as viewed from the driver's seat, the cross-sectional dimensions of one of said portions determining the maximum obstruction to vision afforded by the assembly at the normal level of vision, the rear edge of the upper part of the panel-receiving portion of the post and the upper part of the standard both having a substantial inclination, the rear edge of the lower part of the panel-receiving portion of the post being substantially vertical, whereby the upper part of the assembly affords a minimum obstruction to vision while its rear edge may conceal the front edge of the closure panel throughout the movement of the latter in a substantially vertical path.

9. A windshield standard assembly, a substantially vertically movable window received by the assembly, an inclined windshield supported by the assembly, the upper rear edge of the assembly having an inclination of the order of that of the windshield and its lower rear edge being substantially vertical, the upper front corner of the window having a path spaced forwardly of said inclined read edge and in close juxtaposition to said vertical rear edge, whereby the front edge of the panel is substantially concealed throughout its path.

10. A windshield standard assembly comprising a standard and a post, the former having a windshield panel-receiving portion, the latter having a closure panel-receiving portion, said portions being located substantially one behind the other as viewed from the driver's seat, the post having a part extending about the outer side of the standard and overlapping its front portion.

11. A windshield standard assembly comprising a standard and a post, the latter having a window-receiving portion at the rear of the post and a part juxtaposed to the side of the standard and overlapping the front of the standard, whereby the standard is enclosed upon three sides by the post.

12. In a vehicle, a windshield standard, a panel having a marginal portion supported by the standard, the standard having a channel-like section with legs diverging in a downward direction, cushion elements disposed between said legs and the panel, one of said elements being tapered in a vertical direction, and a support associated with the lower part of the standard and engaging the bottom of the panel.

13. A windshield standard assembly comprising a standard and a post, the latter having a window-receiving portion at the rear of the post and a part juxtaposed to the side of the post and overlapping the front of the post, whereby the standard is enclosed upon three sides by the post, the cross-sectional dimensions of the window-receiving portion of the post affording the maximum obstruction to vision, and cushioning means between the standard and the part of the post enclosing the same, said cushioning means being disposed substantially behind the window-receiving portion of the post as viewed by the driver.

14. In a vehicle, a windshield standard assembly having a window-engaging portion that determines the maximum effective obstruction to vision in the region of the eye level, said assembly providing a channeled portion to receive a windshield panel, a window movable along a substantially vertical path with a margin in engagement with said first-named portion, said channeled portion being located so that it is substantially concealed from the driver by said first-named portion, said assembly having inner and outer faces disposed substantially in the driver's line of sight, but converging forwardly, the upper part of the assembly having front and rear edges substantially parallel, the lower portion of the rear edge diverging rearwardly from the front edge, whereby the major extent of the window edge may be concealed throughout its path while a small obstruction to vision is afforded.

15. In a vehicle, a windshield standard assembly having a window-engaging portion that determines the maximum effective obstruction to vision in the region of the eye level, said assembly providing a channeled portion to receive a windshield panel, a window movable along a substantially vertical path with a margin in engagement with said first-named portion, said channeled portion being located so that it is substantially concealed from the driver by said first-named portion, said assembly having inner and outer faces disposed substantially in the driver's line of sight, but converging forwardly, the outer face being substantially continuous.

16. In a vehicle, a windshield standard assembly, a windshield panel and side panel with marginal portions engaged by the same, said portions being disposed in alignment substantially in the line of the driver's vision, whereby the parts of the assembly that engage said margins are disposed one behind the other as viewed from the driver's seat, said assembly providing an obstruction to vision having a generally planar sides substantially aligned with the driver's line of sight, the front marginal portion of the side panel being disposed in a plane that intersects the windshield panel inwardly of its outer edge.

17. In a vehicle, a windshield standard, a door post, a folding top connectable to the standard, a post being disposed behind the standard, the standard having a cap extending over the post with its rear edge substantially aligned with the rear edge of the post, said cap being shaped for interfitting engagement with a top connection.

18. In a vehicle, a windshield standard, a door post, a folding top connectable to the standard, a post being disposed behind the standard, the standard having a cap extending over the post with its rear edge substantially aligned with the rear edge of the post, said cap being shaped for interfitting engagement with a top connection, said post having a continuous side enclosing the outer face of the standard.

R. L. CARR.